(12) United States Patent
Kilbride et al.

(10) Patent No.: US 11,612,162 B2
(45) Date of Patent: Mar. 28, 2023

(54) METHODS FOR CRYOPRESERVATION

(71) Applicant: Asymptote Ltd, Cambridge (GB)

(72) Inventors: Peter James Kilbride, Cambridge (GB); George John Morris, Cambridge (GB)

(73) Assignee: ASYMPTOTE LTD., Cambridge (GB)

( * ) Notice: Subject to any disclaimer, the term of this patent is extended or adjusted under 35 U.S.C. 154(b) by 539 days.

(21) Appl. No.: 15/758,831

(22) PCT Filed: Oct. 25, 2016

(86) PCT No.: PCT/GB2016/053320
§ 371 (c)(1),
(2) Date: Mar. 9, 2018

(87) PCT Pub. No.: WO2017/072499
PCT Pub. Date: May 4, 2017

(65) Prior Publication Data
US 2020/0229425 A1    Jul. 23, 2020

(30) Foreign Application Priority Data

Oct. 29, 2015 (GB) ...................................... 1519114
Jul. 21, 2016 (GB) ...................................... 1612663

(51) Int. Cl.
*A01N 1/02*    (2006.01)

(52) U.S. Cl.
CPC ......... *A01N 1/0221* (2013.01); *A01N 1/0284* (2013.01); *A01N 1/0294* (2013.01)

(58) Field of Classification Search
CPC ... A01N 1/0221; A01N 1/0284; A01N 1/0294
See application file for complete search history.

(56) References Cited

U.S. PATENT DOCUMENTS

| | | | |
|---|---|---|---|
| 5,084,377 A | 1/1992 | Rowan et al. | |
| 2004/0036054 A1 | 2/2004 | Haslim | |
| 2004/0266629 A1* | 12/2004 | Maroy | C09K 3/00 507/200 |
| 2009/0098577 A1* | 4/2009 | Edris | C12Q 1/37 435/7.4 |
| 2011/0300079 A1* | 12/2011 | Martens | A61P 39/00 424/10.1 |
| 2012/0216679 A1* | 8/2012 | Jonsson | A61M 1/3627 96/194 |
| 2012/0283503 A1* | 11/2012 | Ostrovska | A61K 49/1896 600/2 |
| 2014/0260346 A1* | 9/2014 | Fuhr | A01N 1/0284 62/62 |
| 2019/0200603 A1* | 7/2019 | Mohanty | A01N 1/0242 |

FOREIGN PATENT DOCUMENTS

| | | |
|---|---|---|
| CN | 102246743 | 11/2011 |
| CN | 104472473 | 4/2015 |
| KR | 100603890 | 2/2006 |
| WO | 0102833 | 1/2001 |

OTHER PUBLICATIONS

Sun et al. (Cell Cryopreservation Technol. (2004) 2(1): 55-65 (Year: 2004).*
Naaldijk et al. BMC Biotechnology (2012)12:49, 10 pages (Year: 2012).*
Animal Production and Health Division: "Cryoconservation of Animal Genetic Resouices", section 7: Basic principles of cyropreservation; Sep. 17, 2012; ISBN: 978-92-5-107306-3; Retrieved from Internet.
"Thermodynamic aspects of vitrification", Crybiology, Academic Press Inc., US,vol. 60, No. 1, Feb. 1, 2010; pp. 11-22; ISSN: 0011-2240.
International Preliminary Report on Patentability dated May 11, 2018 for PCT/GB2016/053320.
European Decision to Grant for EP Application No. 16791431.6 dated Jun. 24, 2021 (2 pages).

* cited by examiner

*Primary Examiner* — Susan M Hanley
(74) *Attorney, Agent, or Firm* — Eversheds Sutherland (US) LLP

(57) ABSTRACT

The present invention relates to methods of cryopreservation and compositions for use in such methods where the methods utilise non-Newtonian fluid properties of the cryopreservation medium to modulate the viscosity of that medium to deliver an improved cryopreservation process.

16 Claims, 13 Drawing Sheets

METHODS FOR CRYOPRESERVATION

CROSS REFERENCE TO RELATED APPLICATIONS

This application claims the benefit of International Application No. PCT/GB16/53320, filed Oct. 25, 2016, and GB Patent Application No. 15 18114.1, filed Oct. 29, 2015 and GB Patent Application No. 16 12663.3, filed Jul. 21, 2016.

FIELD OF INVENTION

The present invention relates to an ice free method for cryopreservation of biological samples, compositions for use in such methods, packages containing the compositions for use and samples preserved by the novel methods.

BACKGROUND OF THE INVENTION

Cryopreservation is a technique used for the preservation of biological samples that involves cooling samples to, and maintaining them for prolonged periods at, very low temperatures, for example −80° C., −136° C. or −196° C. By cooling a biological sample to a low temperature the kinetics of chemical or enzymatic reactions that would otherwise degrade the sample are slowed to such an extent that the sample no longer degrades or only degrades at very slow rate. As a result, biological samples can be stored over prolonged periods and then brought back to ambient temperature as required for use and/or analysis.

The cooling process can, however, have detrimental effects on a biological sample and to mitigate these effects a number of techniques for cryopreservation have been developed, albeit all of these techniques have intrinsic limitations. Traditional cryopreservation techniques involve controlled cooling and results in the formation of ice crystals. An alternative ice free technique, vitrification, avoids the formation of ice crystals during cooling and instead involves solidification of water into an amorphous glass.

Damage to biological samples during cryopreservation processes mainly occurs during the cooling/freezing stage and the warming stage. Solution effects, extracellular ice formation, intracellular ice formation, membrane effects, solute toxicity and dehydration can all lead to sample damage. Some of these effects can be reduced by introducing compounds with known protective impact during the cryopreservation cycle. Compounds with a protective impact during cryopreservation are referred to as cryoprotectants or cryoprotective additives (CPAs).

There are various stresses that a biological sample can encounter during cryopreservation, examples of these stresses and their effects on a cellular level include i) reduction in temperature—can potentially cause changes in the membrane lipid phase and/or depolymerisation of the cytoskeleton; ii) increase in solute concentration, e.g. the concentration of solute in solution increases as a proportion of the solvent freezes—can lead to osmotic shrinkage; iii) increase in ionic concentration—can have a direct effect on membranes including the solubilisation of membrane proteins; iv) dehydration—can cause destabilisation of the lipid bilayers; v) precipitation of salts and eutectic formation—can cause cellular damage though mechanisms not well understood; vi) gas bubble formation—can cause mechanical damage; vii) increase in viscosity—may effect diffusion processes including osmosis; viii) pH changes—can cause denaturation of proteins etc.; and ix) cells become closely packed—can cause membrane damage. There is therefore a need for cryopreservation techniques that minimise exposure of biological samples to these various stresses.

In standard cryopreservation techniques, sometimes referred to as conventional or equilibrium cryopreservation, cells or biomass are cooled at a specific rate either in a controlled rate freezer or a cheaper device such as a Mr Frosty or a CellCool. As the sample temperature descends below its equilibrium melting point ice begins to form (nucleate) and ice crystals then spread from the nucleation point throughout the sample, often causing irreparable damage. As the ice formation process proceeds biological samples such as cells concentrate in solute-dense channels between the ice, until these channels themselves solidify (through vitrification), and the samples are then stored at their designated storage temperatures.

These ice-present cryopreservation techniques are generally considered unsuitable for the preservation of tissues and organs due to the direct ice damage that can occur. In simple terms, ice crystals can expand between, or grow into, cells, causing destruction of the tissue macrostructure and, consequently, the function of the tissue. In practical terms although some extracellular ice can be supported in organs and tissues, intracellular ice is almost always fatal to cells. To date, the only mammalian organs that have been successfully cryopreserved in an ice-present system are sheep ovaries, and these are notably much smaller than most organs or indeed tissue-engineered constructs (see Campbell et al, Human Reproduction 2014 August; 29(8): 1749-1763).

Although conventional cryopreservation is a proven technique for a large number of applications, its application is generally restricted to suspensions of cells or small aggregates. For biopsy samples greater than 1 $mm^3$ in volume such as tissues, organs, or multicellular organisms, unacceptable damage to the material occurs during the freezing and thawing due to ice damage.

Vitrification, in contrast to equilibrium cryopreservation, is an ice-free cryopreservation technique. Various mechanisms are exploited in vitrification to avoid ice growth on cooling. Vitrification relies on bringing a sample resident in a vitrification/cryopreservation medium to below the glass transition temperature (Tg) of that vitrification/cryopreservation medium without allowing ice crystals to form. At temperatures below the glass transition the viscosity of the system increases and the solvent/medium eventually solidifies to deliver a stable sample in which the biological material resides within a low temperature matrix of amorphous solid vitrification/cryopreservation medium.

Cryopreservation through vitrification usually entails adding a cryoprotectant (CPA) containing cryopreservation medium to a biological sample prior to cooling that reduce the freezing temperature of the medium and aqueous components of the sample and also increase the viscosity of the aqueous components of the sample so that ice crystal formation during cooling below the equilibrium freezing point is avoided and the transition between the liquid to the solid state does not involve crystallisation. Vitrification of biological samples however typically requires rapid cooling, for example cooling rates of 10,000° C./min or more and this intrinsically limits the approach to very small sample sizes. Typically, vitrification samples are presented in a straw with an internal diameter of 1 mm or less. For larger samples it is very difficult to obtain vitrification.

Vitrification may also be achieved with a combination of rapid cooling and simultaneous application of high pressure, but this involves high cost and requires skilled operators. Addition of high concentrations of solutes such as dimethylsulphoxide (DMSO) in the vitrification process before cooling can be useful, however toxicity of the resultant solutions to biological samples is often observed, while perfusion/diffusion of these high-viscosity liquids into complex tissues can be difficult.

Vitrification (ice free cryopreservation) of mammalian embryos and oocytes in small volumes of liquid has been demonstrated to be effective at retaining cell viability and function. However, despite extensive research, vitrification of larger biological samples to retain viability and function upon warming has not been demonstrated, primarily this appears to be a result of the practical difficulties in achieving rapid enough cooling/warming rates, avoiding ice nucleation and minimising cryoprotectant toxicity.

Many tissues and tissue engineered organs do not have any shelf life after removal from a patient or culture. This leads to waste and damages the economy of techniques using these materials, and as such Just-in-Time manufacture is usually not feasible for tissue engineered constructs. Methods for better preservation, such as those described herein, are therefore required.

It is an object of the present invention to provide an improved ice-free cryopreservation technique that is suitable for the preservation of biological samples, in particular samples such as tissues or tissue constructs that cannot be cryopreserved with existing techniques. It is also an object of the invention to provide compositions for use as cryopreservation media in the methods described herein.

SUMMARY OF THE INVENTION

In a first aspect the invention provides a method for the cryopreservation of biological samples comprising use of a non-Newtonian fluid as a cryopreservation medium.

The invention also relates to a method for cryopreservation comprising modulation of the viscosity of a cryopreservation medium used therein by applying at least one stress.

In preferred embodiments the methods of the invention are ice free methods.

In some embodiments the at least one stress may be used to effect shear thinning (i.e. decrease viscosity) of the cryopreservation medium. A stress used to effect shear thinning is referred to herein as a shear thinning stress. In some embodiments of the methods of the invention the at least one stress may be used to effect shear thickening (i.e. increase viscosity) of the cryopreservation medium. A stress used to effect shear thickening is referred to herein as a shear thickening stress. In some embodiments the method may comprise applying two or more stresses in a sequential manner, i.e. one after the other. In some embodiments the methods comprise applying a first stress for a period of time to produce a first non-Newtonian fluid behaviour and then changing the magnitude of the first stress to produce a second non-Newtonian fluid behaviour. In some embodiments the methods can comprise applying a first shear thinning stress and a second shear thickening stress. In some embodiments the stress is applied by mechanical, sonic, magnetic or electromagnetic radiation means or a combination of a plurality of these means in a simultaneous or sequential manner.

In some embodiments a shear thinning stress is applied at a temperature from the equilibrium melting point of the cryopreservation medium to 40° C. to accelerate perfusion and/or diffusion of a cryoprotective agent (CPA) into a sample, for example a tissue sample or an engineered tissue construct. In some embodiments a shear thickening stress is applied either before cooling commences or at the same time as cooling is initiated.

In general the cooling rate in the embodiments is less than 100° C. per minute. In some preferred embodiments the cooling rate is less than 50° C., for example less than 20° C. per minute, for example less than 10° C. per minute, for example less than 5° C. per minute, or about 1° C. per minute.

In some embodiments the method further comprises the step of taking a sample preserved, i.e. cryopreserved, by the methods described herein, warming the sample to its glass transition point and applying a shear thickening stress at a temperature from below or at the glass transition temperature until the sample temperature rises above its freezing point.

In some embodiments the methods according to the invention may be used to prepare a sample for freeze drying. In such embodiments, after samples have been vitrified using the methods detailed above and herein, the samples are freeze-dried, i.e. they are removed to a freeze drying device and the water or a substantial portion thereof is removed. This advantageously allows freeze drying to be performed in a more effective manner than is possible by conventional methods. This can advantageously reduce the cost of freeze drying or improve the product obtained by freeze-drying.

The invention also relates to cryopreservation medium compositions with non-Newtonian fluid properties as well as methods comprising use of such media.

In general, the cryopreservation medium compositions according to the invention comprise a particulate material with mean particle size of 10 µm or less that serves to confer non-Newtonian properties to the cryopreservation medium composition. The particulate material with mean particle size of 10 µm or less that can confer non-Newtonian properties to a cryopreservation medium are referred to as non-Newtonian additives (NNAs).

In preferred embodiments the non-Newtonian fluid cryopreservation medium comprises from 2% by weight to about 60% by weight of a particulate material with mean particle size of 10 µm or less, i.e. a NNA, the residual mass being that of CPA and water. For example, a cryopreservation medium comprising 54 g of NNA and 46 g in total of water and CPA can be referred to as a cryopreservation medium composition comprising 54 wt % of NNA and 46 wt % in total of water and CPA. For the avoidance of doubt, % wt or wt % are equivalent and mean percentage by weight in the total composition. An amount of 100 g of cryopreservation medium according to the invention therefore comprises from 2 g to 60 g of non-Newtonian additive. In some preferred embodiments the cryopreservation medium composition comprises from 2 wt % to 55 wt % of NNA, for example from 5 wt % to 40 wt % or from 10 wt % to 35 wt %. In some embodiments the NNA has a particle size of 1 µm or less, for example nanoparticle of size from 1 to 100 nm. In some embodiments the particulate NNA material is selected from silica ($SiO_2$), glass, titanium dioxide, alumina, quartz, iron oxide, a synthetic polymer or a biologically derived polymer, or a mixture of two or more of these materials. When the NNA is a mixture of materials this may be advantageously exploited to provide a cryopreservation medium with both sheer thinning and sheer thickening behaviour. In some preferred embodiments the biologically derived polymer NNA is a natural starch or a derivative thereof, for example hydroxyethyl starch. In some embodiments the NNA is silica, for example silica balls. In some embodiments the NNA is iron oxide, for example iron oxide nanoparticles. In some embodiments the NNA is a ferromagnetic material such as iron oxide encapsulated in a polymeric matrix.

In some preferred embodiments the non-Newtonian fluid cryopreservation medium is an aqueous solution or suspension.

In some embodiments the non-Newtonian fluid cryopreservation medium contains a cryoprotective agent in an amount of up to 40% by weight (40 wt %) of solvent, for example from 10 wt % to 40 wt %. In some embodiments the cryoprotective agent is selected from the group comprising dimethyl sulfoxide, formamide, acetamide, $C_1$-$C_3$ alcohols, 1,2-isopropyldiol, 1,2-propanediol, ethylene glycol, propylene glycol, glycerol, glucose, mono-saccharides, disaccharides (sucrose, trehalose, lactose), polysaccharides (raffinose, dextran), ficoll, polyethylene glycol, polyvinylpyrollidine, or a combination of two or more of these agents. In some embodiments the cryoprotective agent is selected from dimethyl sulfoxide, glycerol, glucose, propylene glycol, and polyethylene glycol or a combination of two or more of these CPAs. In preferred embodiments the non-Newtonian fluid cryopreservation medium contains 10 wt % or more of water, for example 30 wt % or more, 40 wt % or more or 50 wt %.

In some embodiments the cryopreservation media of the invention for use in the methods of the invention comprises HES as a non-Newtonian additive. In some embodiments the cryopreservation media comprises HES (hydroxyethyl starch) in an amount of from 40 wt % to 60 wt % and in preferred cases where shear thickening properties are desired the composition comprises from 48 wt % to 54 wt % of HES.

In embodiments wherein the cryopreservation medium of the invention contains HES as a non-Newtonian additive, it is preferred that the cryopreservation medium comprises from 5 wt % to 20 wt % of CPA, for example from 10 wt % to 15 wt % of CPA. The CPA in such compositions may be a single CPA or a combination of two or more CPAs, for example two CPAs. In some embodiments the HES comprising compositions also contains DMSO as a single CPA or a combination of DMSO and a CPA selected from sucrose, glucose, glycerol, raffinose, fructose, trehalose or lactose or a combination of sucrose, glucose, glycerol, raffinose, fructose, trehalose or lactose. In compositions wherein DMSO is used in combination with sucrose, glucose, glycerol, raffinose, fructose, trehalose or lactose or a combination of two or more CPAs selected from sucrose, glucose, glycerol, raffinose, fructose, trehalose or lactose, the weight ratio of DMSO to the other CPAs is from 1:2 to 2:1. Thus in one embodiment the invention provides a cryopreservation medium of composition 48-54 wt % HES, 5 wt % to 20 wt % of a CPA, or a combination of CPAs, and water, for example 48-54 wt % HES, 10 wt % to 15 wt % of CPA, or a combination of CPAs, and water. In some embodiments the CPA component of the composition is 5 wt % DMSO and 10 wt % sucrose, glucose, glycerol, raffinose, fructose, trehalose or lactose. In some embodiments there is provided a cryopreservation medium composition containing 50 wt % HES and upto 40 wt % of CPA, the remainder being water.

In a further aspect the invention provides a package containing a cryopreservation medium according to the invention. In some embodiments the container is a sealed package such as an ampule or an infusion bag or the like. In some embodiments the package is an aseptic package. In some embodiment the package is provided in a water free and/or solvent free form for reconstitution.

In a further aspect the invention relates to use of a particulate material having a mean particle size of 10 mm or less to confer non-Newtonian fluid properties to a cryopreservation medium. In some embodiments the particulate materials for use are starch or a starch derivative such as hydroxyethyl starch, silica, silica ($SiO_2$), glass, titanium dioxide, calcium carbonate, alumina, quartz, iron oxide or a synthetic polymer such as polyvinyl chloride or polystyrene. In some embodiments the particulate material for use is selected from hydroxyethyl starch, iron oxide or silica.

In a further aspect the invention provides a sample, for example a tissue sample or a tissue engineered construct, preserved according to a method described herein and above.

BRIEF DESCRIPTION OF THE DRAWINGS

In order that the invention can be better understood reference is made to the following figure.

DETAILED DESCRIPTION

Figure 1:
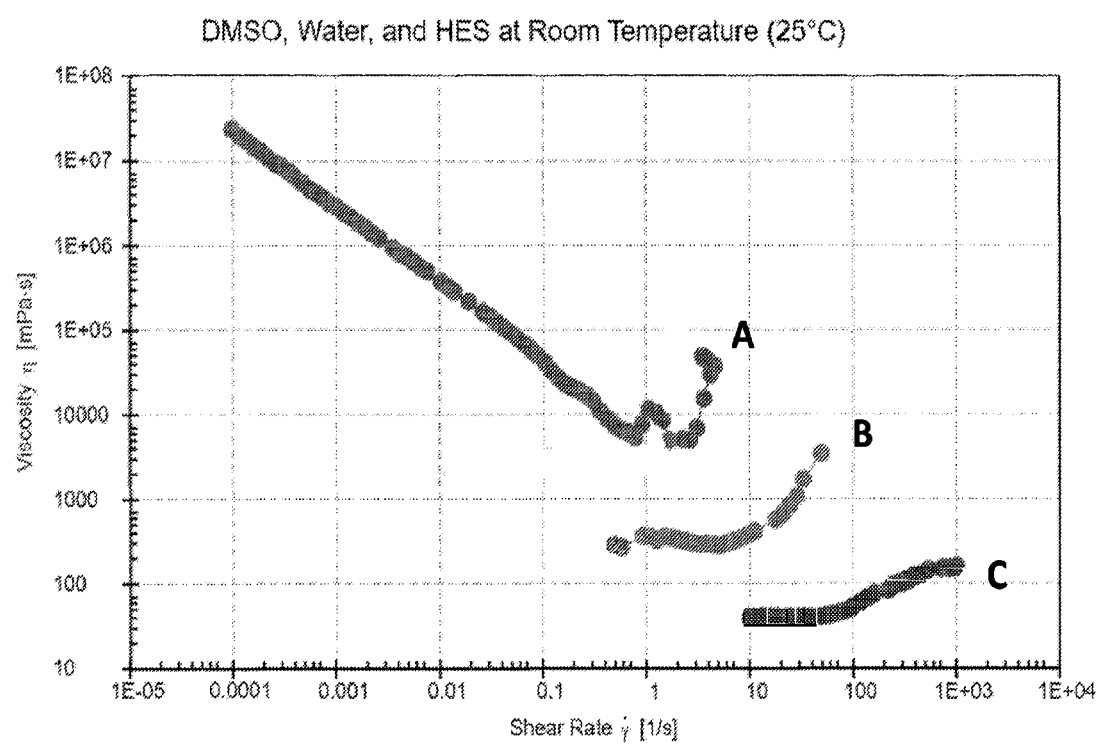
FIG. 1 shows the shear thinning and shear thickening behaviours of various cryopreservation media comprising HES, DMSO and water as a function of shear rate

In the methods of the invention the non-Newtonian fluid properties of the cryopreservation medium are exploited to modulate, i.e. increase (via shear thickening) or decrease (via shear thinning), the viscosity of the cryopreservation medium as appropriate for the phase of the cryopreservation process. Decreasing the viscosity of the cryopreservation medium can be advantageous as a cryoprotective agent (CPA) colloid solution may initially take many minutes to perfuse and/or diffuse into organic tissue and inducing some shear stress can lower this viscosity (i.e. the viscosity of the cryoprotective agent colloid solution or cryopreservation medium) so reducing perfusion time. As CPA toxicity is time-dependant, total toxicity during the perfusion state is reduced as a function of the reduced perfusion time.

Increasing the viscosity of the cryopreservation medium by applying a shear stress as described herein can advantageously be used to prevent the formation of ice crystals in the sample while cooling to a temperature below the freezing point of water, thus substantially or completely eliminating the growth of ice crystals. This viscosity modulating effect is equally important during the thawing cycle as heating with an increased viscosity prevent or at least substantially reduces the chances of ice crystallisation at this stage of the cryopreservation process.

Advantageously, some non-Newtonian fluids, for example some cryopreservation media of the invention can shear thin on application of a shear stress of a first amplitude or type and shear thicken on application of a shear stress of a first amplitude or type. As a result, the invention encompasses cryopreservation methods and cryopreservation media for use in such methods wherein the dual advantages of shear thinning and shear thickening in the cryopreservation process can be exploited in a single cryopreservation cycle.

Another advantageous feature of increasing the viscosity of the cryopreservation medium by exploiting non-Newtonian fluid properties is that a rate of cooling can be applied that is much lower than those used in the vitrification methods of the art and thus renders practical cryopreservation of tissue samples and constructs that cannot be cryopreserved with the methods that form the state of the art.

In addition, exploiting the non-Newtonian fluid properties of the cryopreservation medium may allow reduced amounts of cryoprotectant or cryoprotective additives (CPAs) and/or reduce the time required to perfuse and/or diffuse the CPAs into the sample and this advantageously reduces any toxic effects that a CPA may exert on a biological sample during the cryopreservation process. Decreasing the viscosity of the cryopreservation medium can also potentially improve fluid transport across the cell membrane by shifting the equilibrium ion or solute concentrations in the intracellular and extracellular domains and/or by accelerating ion/solute transport across the cell membrane thus accelerating the rate at which the equilibrium is obtained.

Modification of the viscosity of the cryopreservation medium can be effected by applying an external stress to induce non-Newtonian properties. Induction of non-Newtonian properties can be achieved by shear thickening or shear thinning, by sound thickening or sound thinning, or by electromagnetic field thickening or thinning, for example magnetic thinning or thickening. Some preferred non-Newtonian fluids undergo a reduction in in viscosity when exposed to low frequency stress and undergo an increase in viscosity in response to a high frequency stress. Reference to shear thinning and shear thickening above and herein can refer to stress applied mechanically, sonically, magnetically or by electromagnetic radiation.

Shear forces can be exerted for example by shaking (vibration), stirring (agitating), pressure waves or other mechanical means. For example, shear forces can be applied to a biological sample in a cryopreservation medium in turn in a cylindrical container by immersing a rod into the cryopreservation and then rotating the rod. Another example of a configuration in which a shear force could be applied to a sample would involve placing a biological sample in a cryopreservation medium between two parallel plates with either one or both of these plated moving parallel relative to the other. Shear thickening is the non-Newtonian behaviour wherein the viscosity of a fluid increases on the application of stress to a fluid. Shear thinning is the non-Newtonian behaviour of fluids whose viscosity decreases under shear stress. The fluid that undergoes shear thinning or shear thickening can be a solution or a suspension, for example a colloidal suspension. For example, the shear thickening fluid cryopreservation medium may be a suspension containing fine particles such as silica, a colloidal solution/suspension or a solution per se. This mechanism (i.e. the methods of the invention of cryopreservation that exploit the non-Newtonian fluid properties of a cryopreservation medium to deliver substantially ice free cryopreservation methods) is not isolated to only systems where CPAs are spiked with hard shell colloids such as silicone, HES, glass etc. Spiking with materials that enable electromagnetic field induced viscosity changes, sound and/or light induced viscosity changes, are also possible. This list is not exhaustive.

Thus the methods of the invention allow for improved perfusion/diffusion and consequently reduced CPA toxicity by utilisation of a shear stress to reduce viscosity, subsequent utilisation of shear stress of a different amplitude or type can then be used to increase the viscosity of the cryopreservation medium and allow ice free cryopreservation at cooling rates much lower than those used for the ice free cryopreservation techniques of the art.

An exemplary cryopreservation method according to the present invention comprises placing the sample to be preserved in a cryopreservation medium as described herein with non-Newtonian fluid properties prior to cooling to low temperature and then:

i) applying a shear thinning stress for a first period of time sufficient to allow the cryopreservation medium to perfuse into the sample;

ii) applying a shear thickening stress to increase the viscosity of the cryopreservation medium;

iii) cooling the sample to a temperature below the glass transition temperature;

iv) removing the shear thickening stress; and v) storing the resultant vitrified sample at low temperature.

In methods described herein where a shear thickening stress is applied during cooling, the shear thickening stress is generally removed at a temperature around the glass transition temperature of the cryopreservation medium. For example, it is possible to remove the shear stress at a temperature the slightly above the glass transition temperature of the cryopreservation medium as the effect against ice nucleation will not dissipate immediately on removal of the stress. Nonetheless in these methods it is generally preferable to maintain the shear thickening stress until the sample has been cooled to the glass transition temperature or below.

An alternative cryopreservation method according to the invention comprises placing the sample to be preserved in a cryopreservation medium as described herein with non-Newtonian fluid properties prior to cooling to low temperature and then:

i) applying a shear thickening stress to increase the viscosity of the cryopreservation medium;

ii) cooling the sample to a temperature below the glass transition temperature;

iii) removing the shear thickening stress; and iv) storing the resultant vitrified sample at low temperature.

An alternative cryopreservation method according to the invention comprises placing the sample to be preserved in a cryopreservation medium as described herein with non-Newtonian fluid properties prior to cooling to low temperature and then:

i) applying a shear thinning stress for a first period of time sufficient to allow the cryopreservation medium to perfuse into the sample;

ii) cooling the sample to a temperature below the glass transition temperature; and iii) storing the resultant vitrified sample at low temperature.

The methods according to the invention may further comprise a warming step, i.e. the step of taking the low temperature cryopreserved sample and applying a shear thickening stress at a temperature from below, at, or above the glass transition temperature until the ice nucleation can no longer occur, for example at or near its equilibrium freezing point. Although it is generally preferred to initiate the shear thickening stress at, or below, the glass transition temperature of the cryopreservation medium, i.e. when the sample is still in a fully vitrified state, it is possible to allow the temperature to rise above the glass transition by a number of degree before applying the shear thickening stress. It is important to ensure that the shear thickening stress is applied in the temperature range where ice nucleation in the warming step is most probable, for example in the range of temperature from −80° C. to 0° C. or from −80° C. to the equilibrium freezing point). The warming rate is preferably less than 10° C. per minute, for example 1° C. per minute.

An alternative cryopreservation method according to the invention comprises placing the sample to be preserved in a cryopreservation medium as described herein with non-Newtonian fluid properties prior to cooling to low temperature and then:
 i) cooling the sample to a temperature below the glass transition temperature;
 ii) storing the resultant vitrified sample at low temperature;
 iii) warming the sample to above its equilibrium freezing point;
characterised in that a shear thickening stress that is initiated at a temperature below, at, or just above the glass transition temperature of the cryopreservation medium is applied to the sample during warming.

The methods according to the invention may be performed at a cooling rate of less than or equal to 100° C. per minute for example 50° C. per minute and preferably less than 10° C. per minute, for example 1° C. per minute.

The shear thinning or shear thickening stresses in the methods of the invention may be applied by mechanical, sonic, magnetic or electromagnetic radiation means.

Upon sufficient perfusion for a given biological system, the viscosity of the colloidal suspension can be increased extremely rapidly until is exhibits solid-like properties. This has two major advantages which overcome current limitations in cryobiology:
 1. The apparent toxicity of the solution will be greatly reduced—this is because molecular diffusion will be greatly reduced due to the high viscosity of the solution. As toxicity is related to metabolism of toxins, toxicity will be reduced through reduced diffusion rates around the cell membrane.
 2. Ice formation will be inhibited through increased viscosity of the CPA colloid. The system will contain relatively little water compared with traditional ice-forming methods of cryopreservation. This will reduce the temperature at which ice forms and likelihood of individual nucleation events. The increased viscosity caused by the shear stress will inhibit ice formation, preventing ice damage.

The system's temperature will be lowered until below the Tg (glass transition temperature). At this point, shear-stress can be discontinued with the system in a stable vitrified (amorphous solid) state. To thaw the system, sufficient shear-stress will be applied and the system warmed. This overcomes the problems faced with current state-of-the-art thawing devices:
 1. Ice formation will be suppressed through the mechanism described above. This stops ice formation on warming without the need for rapid warming rates.
 2. Toxicity will be reduced due to the mechanisms described above. Toxicity during CPA wash-out are also minimised through applying a suitable shear-force to reduce viscosity and thereby increase cell wash-out time.
 3. Thermal stresses and thermal cracking are avoided through the relatively low cooling and warming rates required compared with current vitrification techniques.

Materials that increase in viscosity under the application of a shear strain are sometimes referred to as dilatant materials. In some embodiments a dilatant cryopreservation medium, or in the plural, dilatant cryopreservation media, is/are preferred for use in the methods described herein.

Non-Newtonian properties can be conferred to a cryopreservation medium by adding a defined amount of an additive that modulates the behaviour of a medium that otherwise essentially exhibits Newtonian fluid properties, i.e. whose viscosity does not vary under applied stress. The classes of additives that can be used to confer non-Newtonian behaviour are referred to herein as non-Newtonian additives (NNAs). NNAs are typically added to cryopreservation media in an amount of from 2 wt % to 60 wt per 100 g total mass of the resultant NNA containing cryopreservation medium. Any suitable NNA may be used in the method although for practical purposes the NNA is selected on the basis that it exerts no substantial toxic effect towards the sample to be preserved under the conditions of the technique. A mixture of NNAs in the specified range, from 2 wt % to 60% wt % may equally be used.

In general terms, any suitable inorganic and organic particle may be used as a NNA. Typically, the mean particle size, i.e. the mean average longest linear dimension, of the NNA is 10 µm or less, for example 5 µm or less or preferably 1 µm or less. In some embodiments nanoparticulate NNAs are preferred. The term nanoparticle as used herein refers to particles with a mean particle size between 1 and 100 nm. Smaller particles can advantageously increase the non-Newtonian effect of the NNA and may accordingly be applied in a lower percentage in the cryopreservation medium than larger particles.

In some embodiments the NNA can be an organic NNA, for example a biologically derived polymer such as a starch derivative or a synthetic polymer such as polystyrene or polyvinyl chloride. Preferred examples of NNAs that are starch derivatives include natural starches such as corn starches, potato starches, wheat starches and other plant derived starches and semi-synthetic starches such as hydroxyethyl starches (HES). In hydroxyethyl starches a plurality of hydroxyl ethyl substituents are introduced onto the hydroxyl groups of the glucose monomers from which the starch polymer backbone is constituted. Thus in some cases the hydroxyethyl starch (HES) may be a starch in which on average, one glucose hydroxyl group per every ten glucose units in the polymer may be substituted with a hydroxyethyl group while in heta starch the degree of substitution is typically from 7-8 hydroxyls per every 10 glucose units. The biocompatibility of HES starches is well known and the use of hydroxyethyl starch is accordingly preferred in some embodiments for cryopreservation of tissue samples and engineered tissue constructs. Cryopreservation media comprising from 45 wt % to 55 wt % of HES, for example from 48 wt % to 54 wt % have proven to have particularly favourable non-Newtonian properties.

A wide range of fully synthetic polymers can be used as a NNA and in some advantageous embodiments may incorporate a functional core such as a ferromagnetic material. Thus particles of a polymer such as polystyrene, poly (methyl methacrylate), polyvinyl chloride or a similar biocompatible polymer can be used as a NNA. In other embodiments a polymer such as polyvinyl chloride, poly(methyl methacrylate), polystyrene or a similar biocompatible polymer can be used to coat a ferromagnetic material, for example iron oxide, for example to ensure or improve its biological compatibility to deliver a NNA that will modulate, e.g. increase or decrease, the viscosity of a cryopreservation medium in response to shear stress or variations in a magnetic field. For example, particles of a ferroelectric NNA can move in a linear or back and forth manner subject to an applied magnetic field and thus rapidly increase the viscosity of the medium, this in turn allows a steady ice-free cooling to be applied to bring the sample below its glass transition temperature (Tg) at which stage the sample undergoes vitrification.

Inorganic NNAs are also suitable for use in the methods of the invention. Examples of inorganic NNAs include silica ($SiO_2$), glass, titanium dioxide, alumina, quartz, a ferromagnetic material such as iron oxide, various clays and the like. Silica is a particularly preferred NNA as it can be readily obtained in defined particle size and purity and is water compatible. Iron oxide, for example in the form of nanoparticles, is also a preferred NNA as it is biocompatible and suitable for use in in vivo applications. Iron oxide allows for the application of shear thickening or thinning stress by application of a magnetic field. Iron oxide can be in the form of magnetite $Fe_3O_4$ or maghemite $Fe_2O_3$.

As well as containing a NNA, the cryopreservation media that are used in the methods of the invention also comprise a cryoprotective agent (CPA). Use of CPAs in cryopreservation is well known. CPAs are used to mitigate some of the stresses experienced by a biological sample in the cryopreservation process. CPAs that are suitable for use in the methods of the invention are water soluble and generally form stable hydrogen bonds with water. The ability of CPAs to form stable hydrogen bonds with water molecules decreases the freezing point of the cryopreservation medium.

The role of the CPA is manifold and depends on the context and concentration of its use. For example, a low molecular weight CPA may enter a cell during the cooling process and reduce the tendency for ice nucleation to occur during cooling. High molecular weight CPAs will not usually cross the cell membrane and accordingly exert their effects in the extracellular milieu. In lowering the freezing point of the extracellular fluid, a CPA can prevent excessive efflux of water from a cell thereby preventing a cell's shrinkage beyond its minimum critical volume. By reducing cellular retraction, CPAs can attenuate hyperconcentration of intracellular fluid and thereby inhibit the precipitation of protein. Ideally the CPA will be able to perfuse into a biological sample at a sufficient rate to exert its protective effect, the advantageously slow cooling rates of the methods of the present invention compared to the vitrification methods of the prior art in which cooling rates of 10,000° C. per minute are common allows for progressive perfusion during the cooling phase of the cryopreservation process. CPAs can also prevent generation of excessive salt concentrations during the freezing process that can be toxic to the cell. For example, in a solution the relative concentration of the solute will increase as the solvent in which it is dissolved solidifies (freezes).

Any suitable CPA or combination of CPAs may be used in the methods of the invention. Examples of well known CPAs that may be used alone or in combination in the methods of the invention are dimethyl sulfoxide, formamide, acetamide, $C_1$-$C_3$ alcohols, 1,2-isopropyldiol, 1,2-propanediol, ethylene glycol, propylene glycol, glycerol, glucose, mono-saccharides, disaccharides (for example sucrose, trehalose, lactose), polysaccharides (for example raffinose, dextran), ficoll, polyethylene glycol, polyvinylpyrrollidine. The selection of CPA will be dependent to a certain extent on the nature of the sample to be cryopreserved. Thus transmission of the CPA across a cell membrane will not be an important consideration when preserving protein samples whereas for preservation of cells, tissues and engineered tissue constructs this will be a greater factor. Likewise, it will be apparent to the skilled person that the ability of a CPA to perfuse/diffuse into a sample is more important for tissue samples relative to isolated cells.

Typically, the concentration of the CPA or the sum of concentrations of CPAs in the cryopreservation medium in the methods of the invention is less than or equal to 50 wt % and usually less than or equal to 40 wt %, for example from 10 wt % to 40 wt %. At concentrations below 10 wt % of the CPA ice nucleation becomes a more significant factor.

Examples of cryoprotective agents that can be used in methods of the invention include, but are not limited to, low molecular weight (Mr<400) CPAs that can cross cell membranes are alcohols such as methanol, ethanol, 1,2-isopropyldiol, 1,2-propanediol, glycerol, ethylene glycol, formamide, acetamide and dimethylsulfoxide and higher molecular weight and/or non-penetrating CPAs such as monosaccharides (for example glucose), disaccharides (for example sucrose, trehalose, lactose), polysaccharides (raffinose, dextran), ficoll, polyethyleneglycol polyvinylpyrrolidinone and foetal bovine serum. Particularly preferred CPAs are DMSO, glycerol, glucose, propylene glycol, and polyethylene glycol.

The ice free vitrification methods of the state of the art that are typically in the range of hundreds of degrees Celsius and are often of the order of 10,000° C. per minute. As mentioned above the cooling rates used in the methods of the present invention are much slower than those in the ice free vitrification methods of the art and are less than or equal to 100° C. per minute for example 50° C. per minute and preferably less than 10° C. per minute, for example from 1° C. to 10° C. per minute or 1° C. per minute. The use of these relatively slow cooling rates advantageously enables cryopreservation of samples that are much larger than those that can be preserved with the ice free vitrification methods of the art. Ultimately the precise rate of cooling will be a function of the size and composition of the sample but the rates outlined above have proved to be the suitable working ranges for the cryopreservation techniques described herein.

The ice free methods of the present invention have a wide scope of application and are particularly advantageous for samples that are too large to undergo ice free cryopreservation with the methods of the state of the art. For example, many tissues and tissue engineered organs have no, or extremely limited (typically no more than a few hours), shelf lives after removal from the host organism/patient/culture. The limited shelf life leads to excessive waste and results in the cost of using such samples being greatly increased. As a result, Just-in-Time manufacture is usually not feasible for tissue engineered constructs. The methods of the invention thus offer great advantages for the development of regenerative medicine based on tissue engineered constructs such as stem-cell based composite tissue constructs. Such constructs could be preserved with the methods of the invention and this would enable tissue engineered samples to be stored and used in an "off the shelf" manner and as a result radically improve the economics and availability of therapeutic interventions based on such samples.

The invention also provides compositions for use as cryopreservation media in the methods of the invention.

The cryopreservation medium compositions of the invention are aqueous solutions or suspensions comprising from 10 wt % to 40 wt % of a cryoprotective agent (CPA) and from 2 wt % to 60 wt % of a non-Newtonian additive (NNA) that is a biocompatible particulate material with a mean longest average linear dimension 10 µm or less. In some embodiments the cryopreservation medium is a starch free aqueous solution or suspension comprising from 10 wt % to 40 wt % of a cryoprotective agent (CPA) and from 2 wt % to 60 wt % of a non-Newtonian additive (NNA) that is a biocompatible particulate material with a mean longest average linear dimension 10 μm or less. As used herein the term starch free refers to compositions that do not contain starch or any semi-synthetic starch derivative such as hydroxyethyl starch.

The non-Newtonian additive is an organic or inorganic particulate material with a mean longest average linear dimension 10 μm or less. In some embodiments the non-Newtonian additive has a mean longest average linear dimension 1 μm or less. In some embodiments the non-Newtonian additive is in nanoparticle form, for example iron oxide particles with a mean average longest linear dimension of from 1 to 100 nm.

The particulate material used as a NNA is generally selected from the group comprising silica ($SiO_2$), glass, titanium dioxide, alumina, quartz, iron oxide, a synthetic polymer or a biologically derived polymer mixture of two or more of these materials. In some embodiments the biologically derived polymer is a natural starch or a derivative thereof, for example hydroxyethyl starch. In some examples the particulate material is silica, for example silica balls. In some examples the particulate material is iron oxide, optionally iron oxide nanoparticles. In examples the particulate material is a ferromagnetic material encapsulated in a polymeric matrix.

In some examples the cryoprotective agent is selected from group comprising dimethyl sulfoxide, formamide, acetamide, $C_1$-$C_3$ alcohols, 1,2-isopropyldiol, 1,2-propanediol, ethylene glycol, propylene glycol, glycerol, glucose, mono-saccharides, disaccharides (sucrose, trehalose, lactose), polysaccharides (raffinose, dextran), ficoll, polyethylene glycol, polyvinylpyrollidine or a combination of two or more of these agents. In some examples the cryoprotective agent is selected from dimethyl sulfoxide, glycerol, glucose, propylene glycol, and polyethylene glycol or a combination of two or more of these CPAs. In some preferred examples the cryoprotective agent comprises dimethyl sulfoxide.

The invention therefore provides a smart material that reduces toxicity, reduces thermal stresses, and inhibits ice formation during cryopreservation of biologics (biological samples). Spiking chemicals (CPAs) used in cryopreservation such as glycerol, dimethylsulphoxide, sugars, alcohols, polyethylene glycol, ethylene glycol, with small (<10 μm) solid particles such as silica balls, nanoparticles, HES, and/or $SiO_2$ can be used as a method to cryopreserve biological samples through non-Newtonian fluid properties being exploited by way of increasing and/or decreasing the viscosity of the solution used to achieve cryopreservation.

The smart materials are those where any (spiking) chemical (CPA) used is recorded as having temperature dependant cell-membrane stabilization effects, reduces the likelihood of intracellular ice, suppresses the freezing point of a water-based solution, reduces the likelihood of ice formation, lowers the equilibrium melting point of a water based solution, reduces cold-shock or cold-temperate related injuries, or protects against any other cryopreservation related injury, or any combination of these.

The solid particles used induce non-Newtonian behaviour through shear-thickening and/or thinning, sound thickening and/or thinning, electromagnetic field thickening and/or thinning, electromagnetic radiation thickening and/or thinning. Or any other non-Newtonian mechanism, or combination of these.

The invention also relates to the use of a particulate material having a mean particle size of 10 μm or less to confer non-Newtonian fluid properties to a cryopreservation medium. Examples of the particulate materials that are suitable for this use are starch or a starch derivative such as hydroxyethyl starch, silica, silica ($SiO_2$), glass, titanium dioxide, alumina, quartz, iron oxide or a synthetic polymer such as polyvinyl chloride or polystyrene.

The non-Newtonian additive can be provided in a package, for example an aseptic package, optionally in combination with the requisite amount of CPA for reconstitution with a defined amount of water and/or the CPA. The cryopreservation media described herein and above can be supplied as a package, for example an aseptic package, ready for use in a cryopreservation method described herein and above. The packages, for example aseptic packages, could be stored ready for use to allow cryopreservation to be performed on fresh samples as soon as they become available and thus improving the cryopreservation success rate.

As will be appreciated by the person skilled in the art the preferred embodiments for each element of the method or the compositions described above may be freely combined. Such combination provides embodiments that feature, for example, the preferred composition ranges and natures of the components of the cryopreservation media or the preferred steps of the method. Thus, a non-Newtonian additive, with the particle size, molecular identity and the composition ranges (% by weight) specified herein can be freely combined with the composition ranges and molecular identity of the cryoprotective agent as an aqueous solution to give the preferred compositions for use in the methods of the invention or for provision as a product for use, for example in the form of an aseptic package.

Further embodiments of the present invention are set out in the following numbered clauses:

1. A smart material that reduces toxicity, reduces thermal stresses, and inhibits ice formation during cryopreservation of biologics. Spiking chemicals used in cryopreservation as glycerol, dimethylsulphoxide, sugars, alcohols, polyethylene glycol, ethylene glycol, with small (<10 μm) solid particles such as silica balls, nanoparticles, HES, and/or $SiO_2$ can be used as a method to cryopreserve biological samples through non-Newtonian fluid properties being exploited by way of increasing and/or decreasing the viscosity of the solution used to achieve cryopreservation.
2. As 1, where any chemical used is recorded having temperature dependant cell-membrane stabilization effects, reduces the likelihood of intracellular ice, suppresses the freezing point of a water-based solution, reduces the likelihood of ice formation, lowers the equilibrium melting point of a water based solution, reduces cold-shock or cold-temperate related injuries, or protects against any other cryopreservation related injury, or any combination of these.
3. As 1, where the solid particles used induce non-Newtonian behaviour through shear-thickening and/or thinning, sound thickening and/or thinning, electromagnetic field thickening and/or thinning, electromagnetic radiation thickening and/or thinning. Or any other non-Newtonian mechanism, or combination of these.
4. As 1 and 3, where the particles used are either molecular, ions, not in the solid state, or not of homogeneous composition, or any combination of these.
5. As 1, 2, 3, and 4, where the non-Newtonian material consists of more than two components, whether that be a combination of those described in 2, a combination of those described in 3, a combination of those described in 4, or any combination of the above.

So that the invention may be better understood a number of examples are provided herein of cryopreservation media according to the invention and their non-Newtonian fluid behaviour. Those skilled in the art will realise that these and similar cryopreservation media comprising an aqueous solution of a CPA in which a non-Newtonian additive is incorporated can be used in the methods of the invention as defined herein and in particular in the appended claims.

EXAMPLES

A solution of 25% water, 25% DMSO, and 50% HES (all by weight) was prepared. This solution was stirred with a stirring rod until completely mixed. The mix was then added to a RheoLab QC Rheometer (Anton-Paar, Graz, Austria) with a concentric cylinder measuring device. The viscosity of the solution was measured at shear rates of between 0.01/s to 2/s. It was found that at increasing shear rates <0.5/s the mix exhibited increasing shear-thinning. At a critical point between 0.5 and 1/s the behaviour of the mix changed markedly to shear thickening. Similar behaviour was also seen in a solution containing 50% HES by weight in water.

A number of additional experiments were performed to parameterise the effect of non-Newtonian additives on the fluid behaviour of cryopreservation media under shear stress.

Shear Thinning and Shear Thickening Effects in Cryopreservation Media Comprising a Non-Newtonian Additive The non-Newtonian behaviour of cryopreservation media comprising various amounts of HES as the non-Newtonian additive in conjunction with various cryoprotectants and water was studied. The results from this study are presented in FIG. 1 wherein the effect of shear rate on the viscosity of a three component cryopreservation media containing 10 wt % DMSO, HES (hydroxyethylstarch 54 wt % (composition A), 50 wt % (composition B) and 45 wt % (composition C)) and remainder water at room temperature (see Table 1). In this study, shear forces were applied to cryopreservation media using a commercially available Anton Paar RheolabQC rheometer coupled to a DG42 measuring system and RheoCompass software.

TABLE 1

Cryopreservation media compositions evaluated in FIG. 1

| Composition | Non-Newtonian Additive | Cryoprotectant | Water |
| --- | --- | --- | --- |
| A | 54 wt % HES | 10 wt % DMSO | 36 wt % |
| B | 50 wt % HES | 10 wt % DMSO | 40 wt % |
| C | 45 wt % HES | 10 wt % DMSO | 45 wt % |

In these experiments, a candidate non-Newtonian cryopreservation medium sample was placed in a chamber defined by two co-axial cylindrical walls projecting upwards from a floor. A hollow cylinder, coupled to a motor to drive its rotation, i.e. the rheometer, was then immersed in the sample located in the chamber. The hollow cylinder was then rotated at a measured rate, the shear rate y, the shear stress was measured by comparing the speed of rotation to the torque required to attain that speed of rotation. Shear rate was defined by the velocity of the hollow cylinder's movement divided by the gap between the hollow cylinder and the chamber edges. The torque required to achieve rotation of the hollow cylinder in the sample was recorded and could be used to determine the viscosity of the solution. Variation of the viscosity as a function of the variation in shear rate could accordingly be established.

As can be seen in FIG. 1, for the 54 wt % HES/10 wt % DMSO/36 wt % H$_2$O system (A), increasing the shear rate from $10^{-4}$ s$^{-1}$ to ca 0.5 s$^{-1}$ caused shear thinning of the solution (the viscosity was observed to reduce by a factor exceeding 1000-fold over this range). In the same sample, increasing the shear rate from 1 s$^{-1}$ to ca 6 s$^{-1}$ at room temperature meanwhile caused a 10-fold increase in the viscosity (i.e. shear thickening effect) of the cryopreservation medium. After the 10-fold increase in viscosity the rheometer reached its maximum torque and so the measurement was terminated. Qualitatively, solidification of the cryopreservation medium occurred at this stage, for example tapping the medium with a metal rod indicated that a solid was present. Thus although the exact viscosity of the medium could not be measured explicitly, the solid nature of the cryopreservation medium that the viscosity would be in excess of $10^9$ mPa·s.

It was thus demonstrated that shear thinning and shear thickening behaviour in a single sample could be achieved solely by varying the shear rate (and thus the shear stress) to which the sample is subjected. Shear thickening behaviour was observed for compositions B and C. From this study it appears that 45 wt % to 54 wt % HES exhibits non-Newtonian behaviour, with scales of viscosity change more pronounced at 50 wt % and above.

Variation in Shear Thickening Effect as a Function of Cryoprotectant

Figure 2:
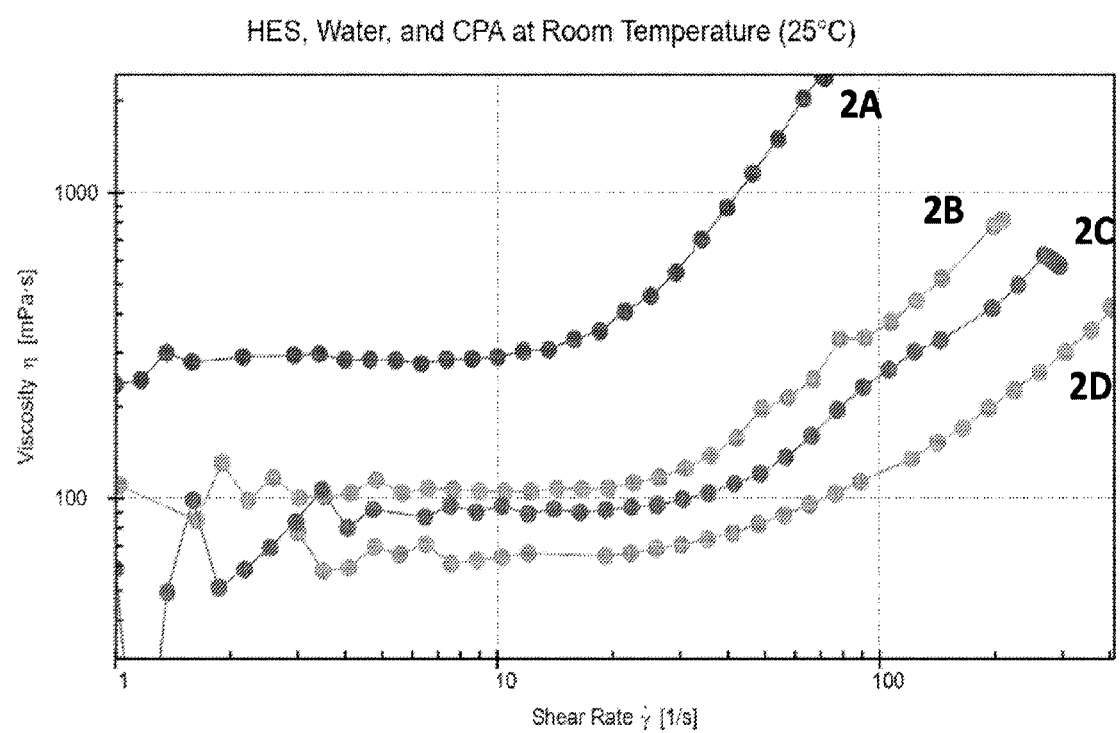
FIG. 2 shows the shear thickening behaviours of various cryopreservation media comprising HES, a selection of cryoprotectants and water a function of shear rate at room temperature.

An experiment was performed to determine whether the cryoprotectant has an effect on the shear thickening behaviour at room temperature, data from this study is presented in FIG. 2. Shear thickening behaviour was observed for all of the cryopreservation media in the study that had a composition of 50% HES (the non-Newtonian additive), 10% cryoprotectant and 40% water (% are by weight). The cryoprotectant (CPA) in the cryopreservation media were sucrose (composition 2A), glycerol (composition 2B), glucose (composition 2C) and DMSO (composition 2D). Although shear thickening behaviour was observed in all of the cryopreservation media the extent of shear thickening varied as a function of the individual composition, i.e. as a function of the CPA. It was thus evident that use of a non-Newtonian additive can provide a cryopreservation medium with non-Newtonian fluid properties independent of the nature of the CPA, albeit the absolute shear thickening effect observed does vary to a degree as a function of the CPA present in the composition. At room temperature, relatively high shear rates of >100 s$^{-1}$ can be required to attain significant shear thickening.

Impact of Temperature on Shear Thickening in Various Non-Newtonian Additive Containing Cryopreservation Media of Composition Containing HES, CPA and H$_2$O Experiments were then performed to establish whether the non-Newtonian behaviour would vary as a function of temperature, since in the intended application it is essential that the non-Newtonian behaviour is manifest at low temperature. FIG. 3 presents data from these studies and it can be instantly seen that not only is the non-Newtonian effect present at low temperatures, in fact the lowering of temperature enhances the non-Newtonian effect and lowers the critical shear rate (the rate at which shear-thickening first becomes apparent). The composition of the cryopreservation media evaluated in this experiment are presented in Table 2 below.

TABLE 2

Cryopreservation media compositions evaluated in FIG. 3

Figure 3A:
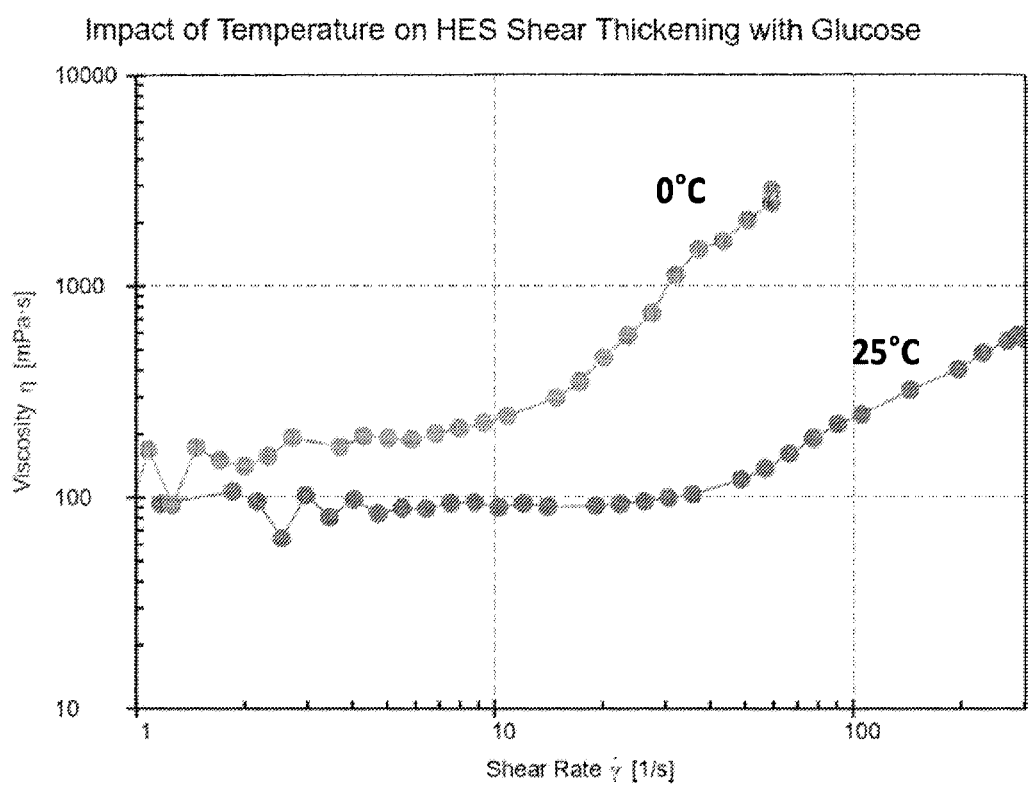
FIGS. 3A to 3H show the shear thickening behaviour of various cryopreservation media at 25° C. and 0° C.
Figure 3B:
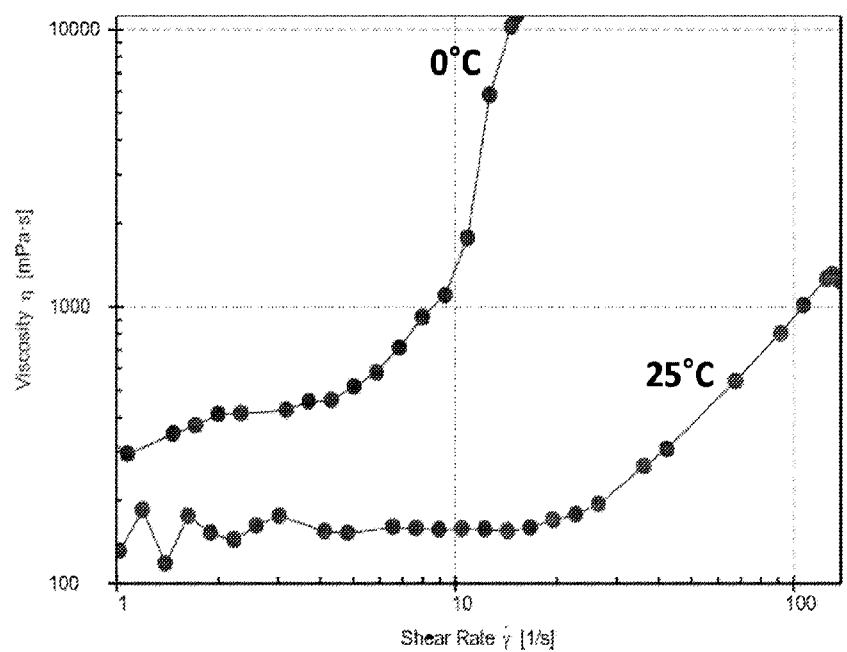
Figure 3C:
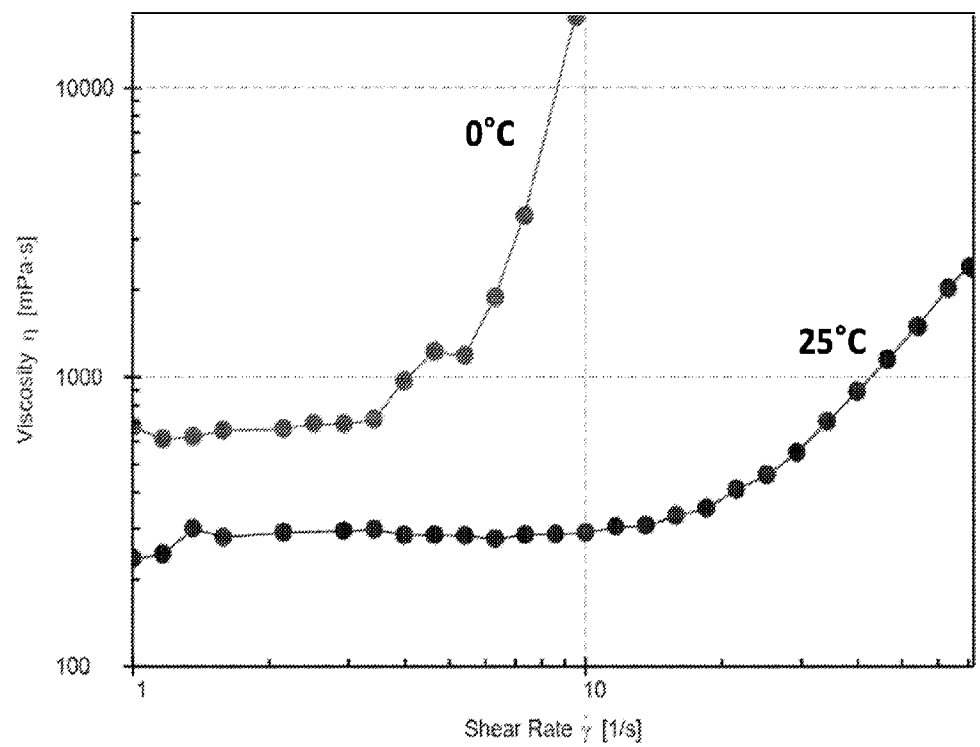
Figure 3D:
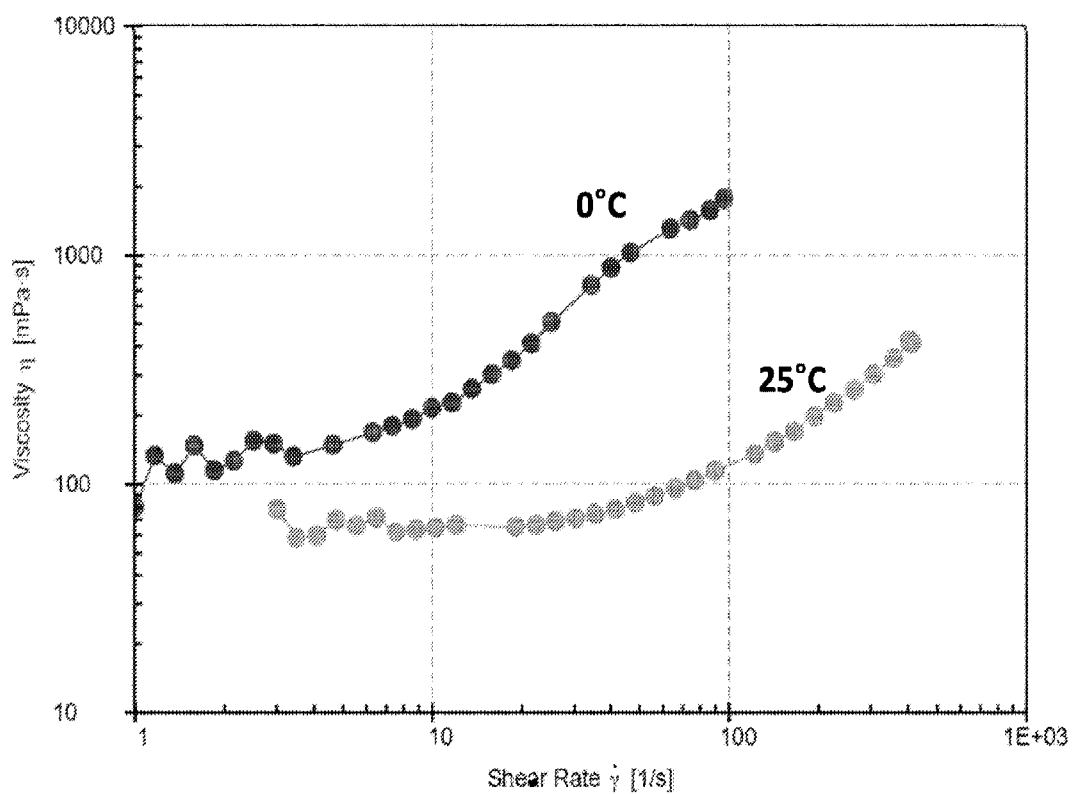
Figure 3E:
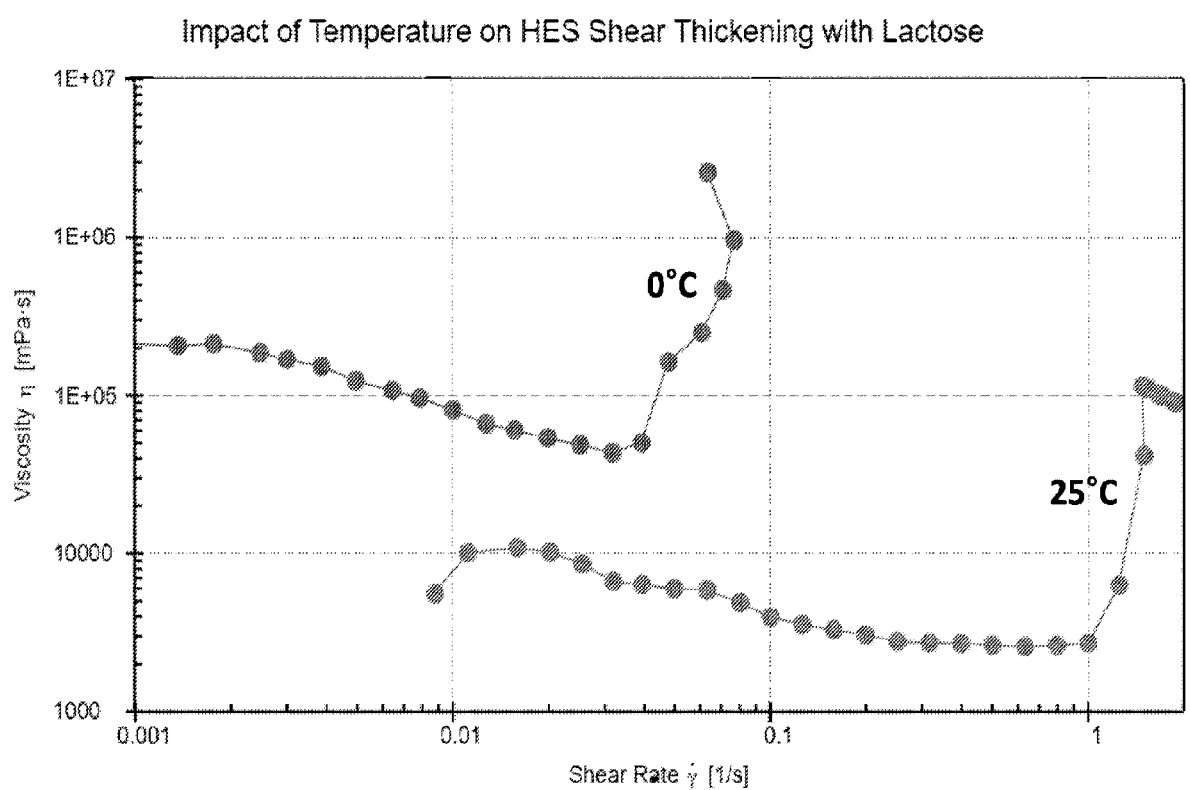
Figure 3F:
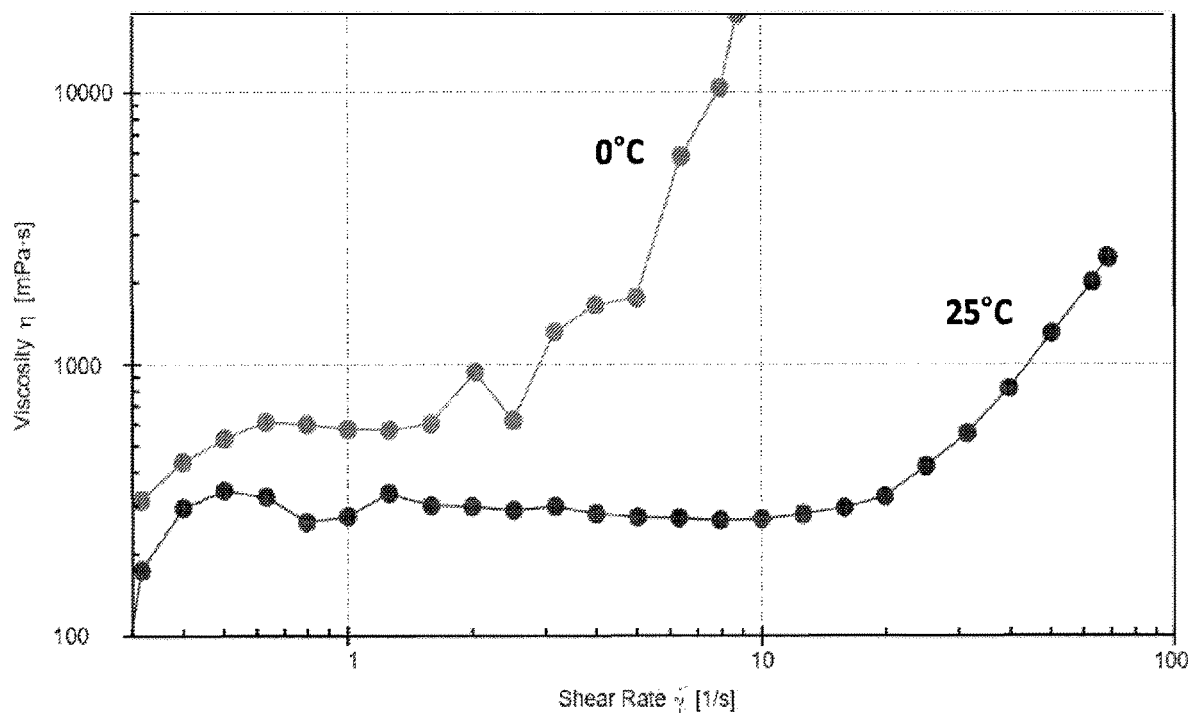
Figure 3G:
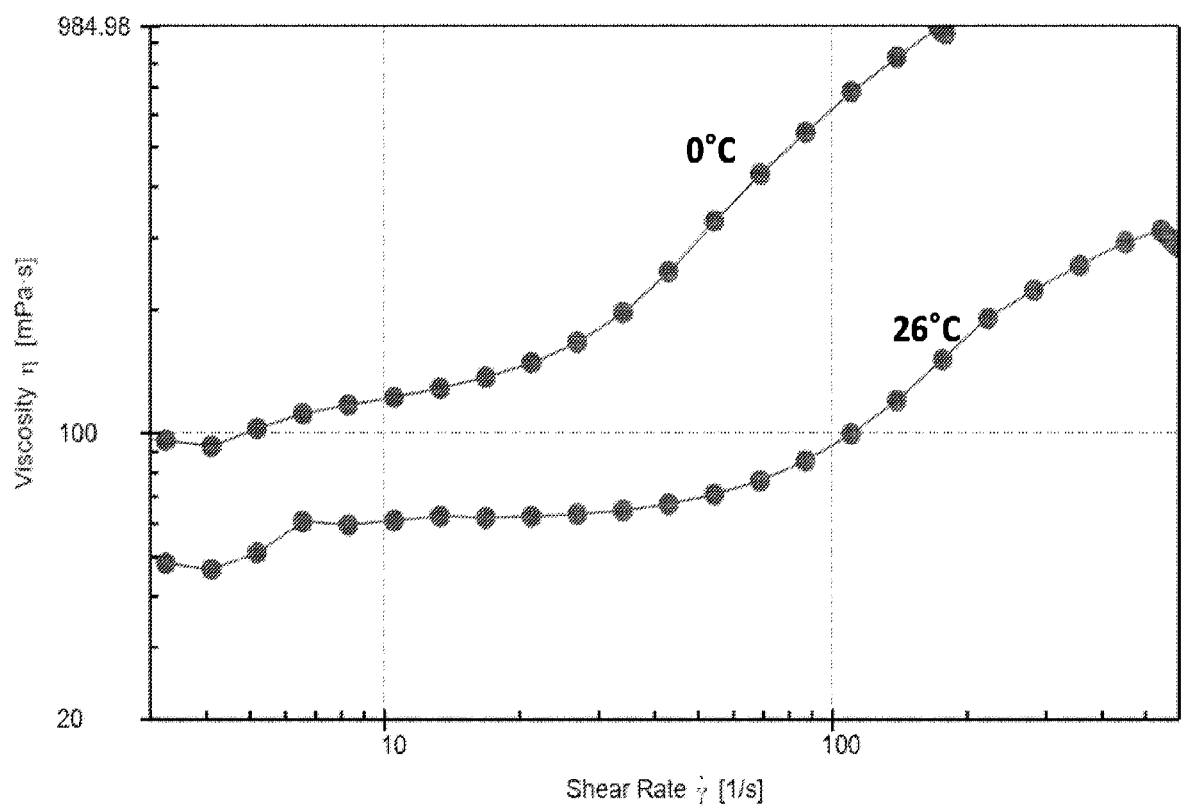
Figure 3H:
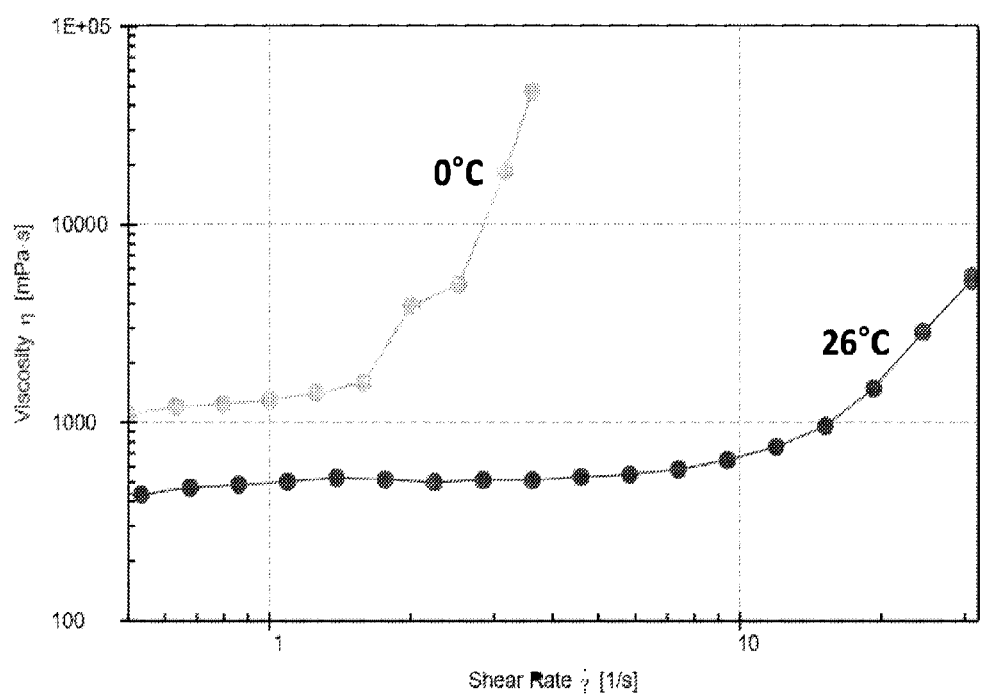

| | Non-Newtonian Additive | Cryoprotectant | Water |
|---|---|---|---|
| FIG. 3A | 50 wt % HES | 10 wt % glucose | 40 wt % |
| FIG. 3B | 50 wt % HES | 10 wt % raffinose | 40 wt % |
| FIG. 3C | 50 wt % HES | 10 wt % sucrose | 40 wt % |
| FIG. 3D | 50 wt % HES | 10 wt % DMSO | 40 wt % |
| FIG. 3E | 50 wt % HES | 10 wt % lactose | 40 wt % |
| FIG. 3F | 50 wt % HES | 10 wt % fructose | 40 wt % |
| FIG. 3G | 45 wt % HES | 10 wt % sucrose | 45 wt % |
| FIG. 3H | 50 wt % HES | 10 wt % sucrose 5 wt % DMSO | 35 wt % |

The results for non-Newtonian additive containing cryopreservation media according to the invention having a 50% HES/10% CPA/40% H$_2$O composition (% by weight) are shown in FIGS. 3a-f. As can be seen, and as was expected the reduction in temperature causes an increase in viscosity of the samples. Unexpectedly, it was also evident from this experiment that the shear thickening resulting from application shear stress was greatly enhanced at lower temperatures relative to that obtained with the same composition at room temperature (e.g. 0° C. vs ca 25° C.)—an enhancement was manifest in both the scale of the effect at low temperature and also in a lowering of the critical shear rates required to initiate the effect at low temperatures. As this enhancement of shear thickening on reduction in temperature was found in all of the cryopreservation media evaluated then this would appear to be a general effect. This hitherto unknown effect of enhancement of shear thickening at reduced temperatures is significant in that highly viscous cryopreservation media can be attained at much lower shear stresses than would be required at room temperature. It follows that, since the shear stress required to achieve a specified viscosity or a specified increase in viscosity at 0° C. is reduced relative to that required at room temperature, a lower shear stress can be used in the cryopreservation techniques according to the invention than would otherwise be expected. Advantageously, this means that shear rates of less than 100 s$^{-1}$ can be used in the methods according to the invention and that samples preserved by these methods can be exposed to a lower shear stress during the method. As a result, any shear stress related damage that might be suffered by a sample for cryopreservation is reduced or eliminated by commencing the shear thickening stress at a temperature below room temperature. This unexpected enhancement of shear thickening at low temperature is also significant in that cryopreservation media compositions that would otherwise appear unsuitable for use in the non-Newtonian cryopreservation techniques based on effects observed at room temperature are, in fact, viable when the non-Newtonian effect at 0° C. is considered.

The results displayed in FIG. 3a-f also revealed that certain CPAs deliver a stronger enhancement in shear thickening as a function of temperature than others. Sugar CPAs (glucose, fructose, lactose, raffinose and sucrose) containing compositions are seen to give a stronger enhancement in shear thickening as a function of temperature than that produced with the corresponding DMSO containing cryopreservation medium (FIG. 3d). This delivers the possibility of using a combination of two CPAs to deliver an optimised viscosity profile for cryopreservation. For example, use of 5 wt % DMSO and 10 wt % of a sugar CPA in the cryopreservation medium (FIG. 3h) delivers a composition with excellent shear thickening properties at low temperature (derived from the sugar CPA) and good cell penetration (derived from the DMSO).

Impact of Temperature on Shear Thickening

Figure 4:
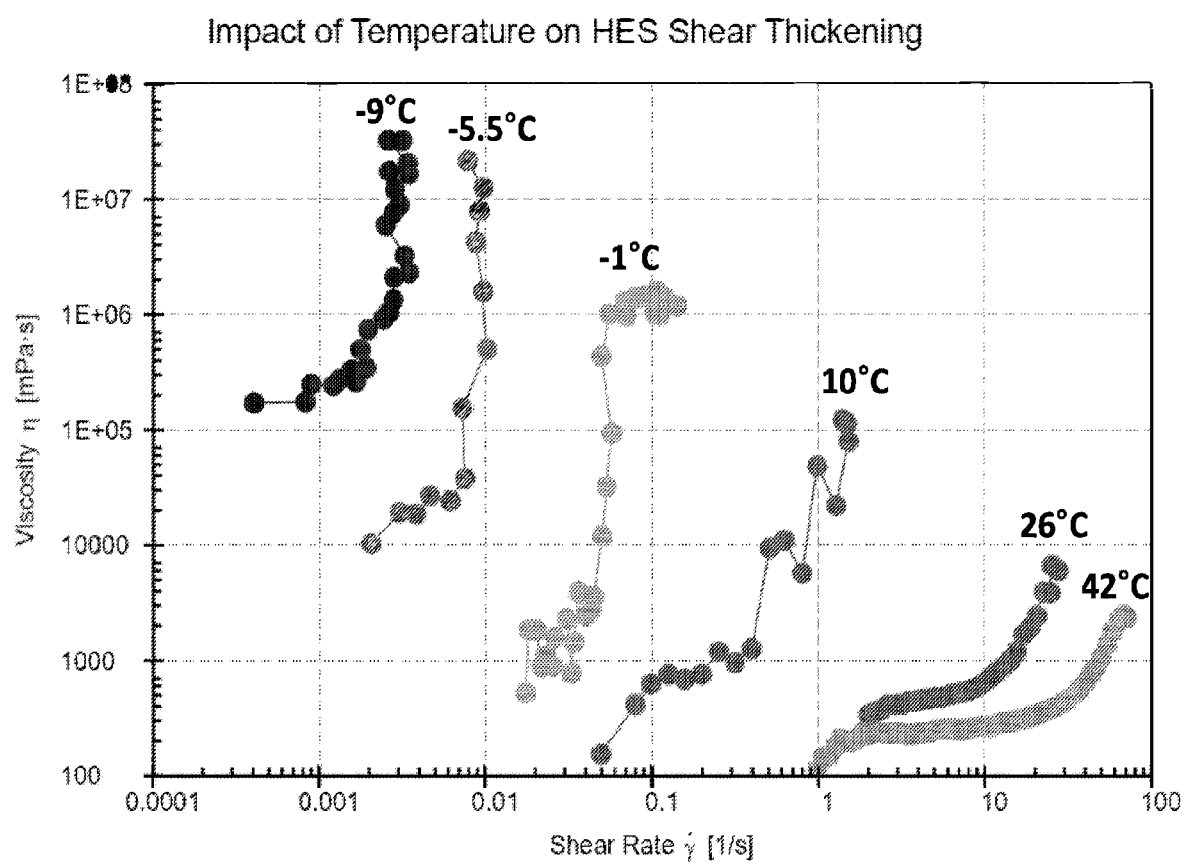
FIG. 4 shows the impact of temperature on the shear thickening behaviour of a cryopreservation medium composition containing 50 wt % HES, 15 wt % CPA & 35 wt % $H_2O$.

In order to further inspect the temperature dependence of the shear thickening effect an experiment in which the shear thickening of a 50 wt % HES/15 wt % CPA/35 wt % H$_2$O cryopreservation medium was evaluated as a function of temperature from -9° C. to 50° C. was performed. The results of this study are presented in FIG. 4. In this experiment the CPA was a 1:2 mixture of DMSO and sucrose (i.e. 5 wt % DMSO and 10 wt % sucrose). As can be seen in FIG. 4, the effect of temperature on the shear thickening effect was most prominent around the freezing temperature of the solution, in this case around -7° C. to -9° C., at which point a viscosity increase of at least 2 or 3 orders of magnitude was achieved with a shear rate of 0.01 s$^{-1}$ or less. It was thus demonstrated that cryopreservation media in which very low shear stresses at low temperature can be used to deliver greatly increased viscosities are obtainable. Analogous temperature dependent shear thickening behaviour was delivered with a range of sugar/DMSO mixtures.

Shear Thinning of Silica and Calcium Carbonate Containing Cryopreservation Medium Compositions As noted above, non-Newtonian additives can be useful for providing shear thinning properties to a viscous cryopreservation media. The non-Newtonian fluid properties of the aqueous SiO$_2$ compositions of Table 3 were evaluated and significant shear thinning was observed (see FIG. 5). Similar results were obtained with calcium carbonate/CPA/water compositions of Table 4 (see FIG. 6).

TABLE 3

Figure 5:
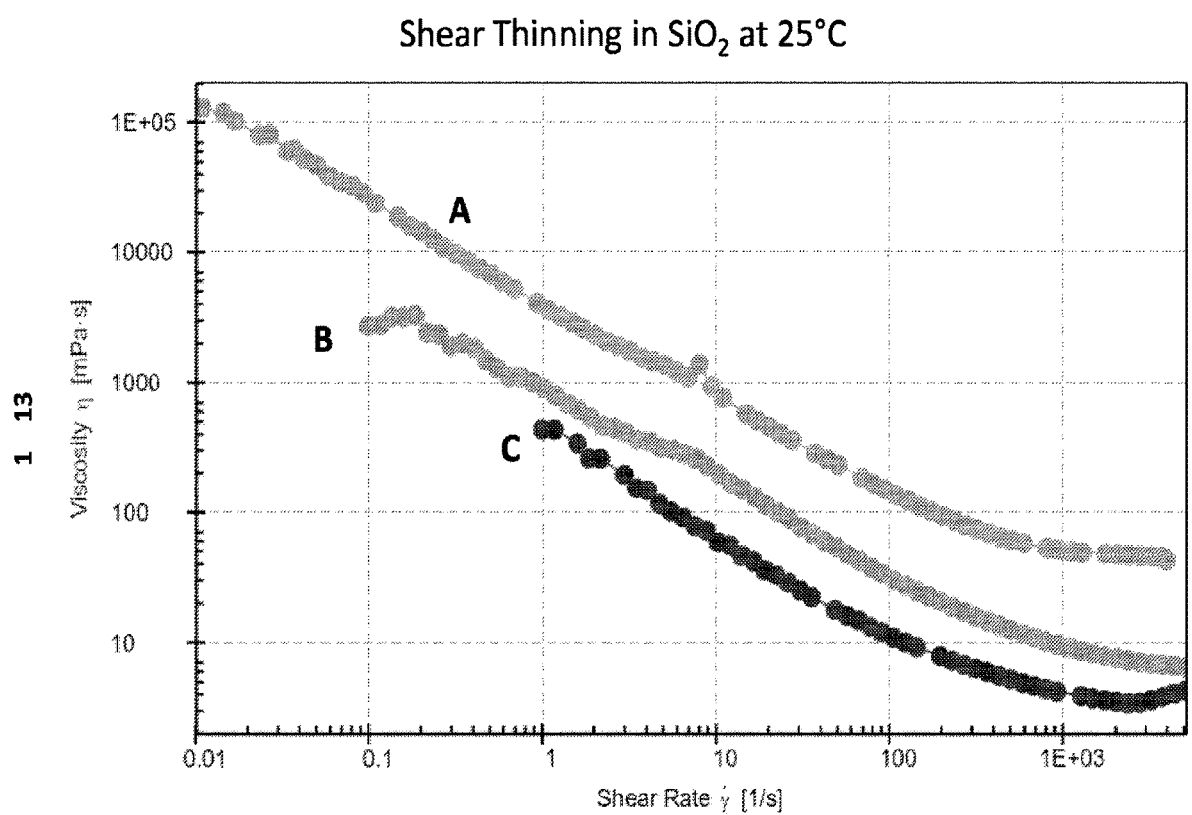
FIG. 5 shows the shear thinning behaviour of various $SiO_2$ containing aqueous solutions.

Compositions of FIG. 5

| Composition | Non-Newtonian Additive | Water |
|---|---|---|
| A | 60 wt % SiO2 | 40 wt % |
| B | 50 wt % SiO2 | 50 wt % |
| C | 40 wt % SiO2 | 60 wt % |

TABLE 4

Figure 6:
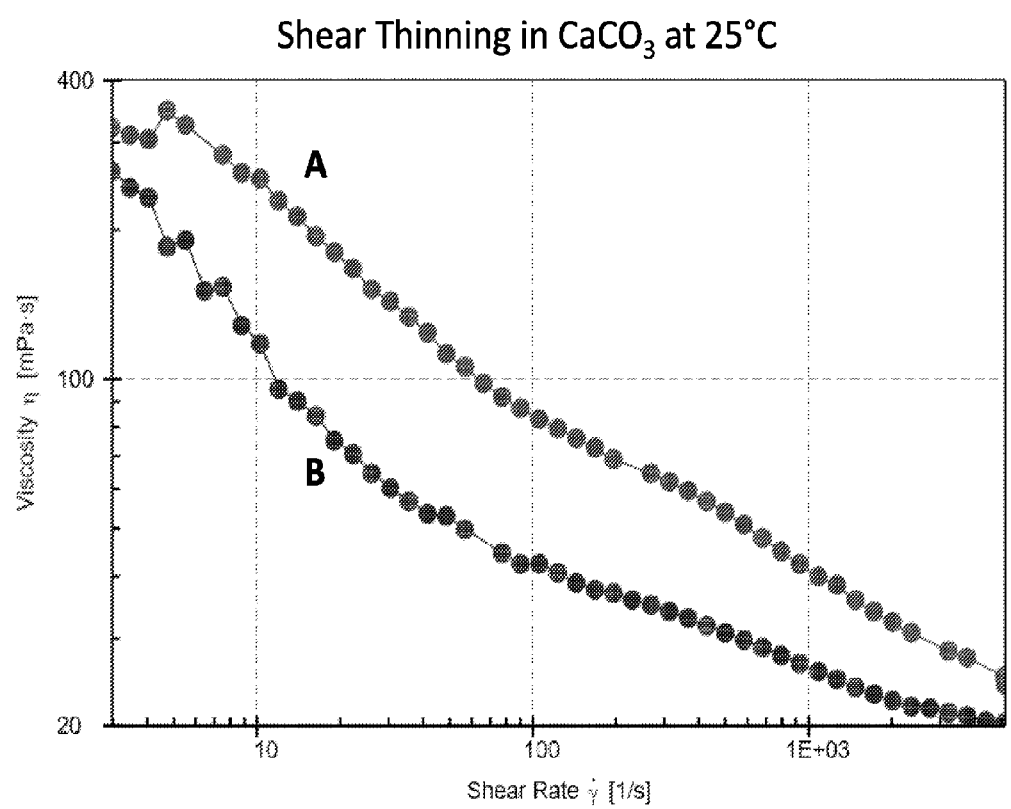
FIG. 6 shows the shear thinning behaviour of $CaO_3$ containing cryopreservation medium compositions.

Compositions of FIG. 6

| Composition | Non-Newtonian Additive | Cryoprotectant | Water |
|---|---|---|---|
| A | 50 wt % CaCO3 | 10 wt % DMSO | 40 wt % |
| B | 50 wt % CaCO3 | 10 wt % glycerol | 40 wt % |

The invention claimed is:

1. A method for cryopreservation of a biological sample using a non-Newtonian fluid as a cryopreservation medium, wherein the method comprises applying a shear stress to control viscosity of the cryopreservation medium during a cryopreservation process, the process comprises the steps of:
   a) contacting the biological sample with the non-Newtonian fluid to produce a contacted biological sample;
   b) a first phase comprising applying the shear stress at a first shear rate to the contacted biological sample to produce a shear thinning stress to allow the cryopreservation medium to perfuse into the contacted biological sample to produce a perfused biological sample; and
   c) a second phase comprising cooling the perfused biological sample and applying the shear stress at a second shear rate to the perfused biological sample to produce a shear thickening stress to prevent formation of ice crystals during cooling of the perfused biological sample;

wherein the method produces a cryopreserved biological sample;

wherein the non-Newtonian fluid consists essentially of an aqueous suspension or an aqueous solution containing 2 wt % to 60 wt % of a non-Newtonian additive that is a particulate material with a mean particle size of 10 μm or less; and from 10 wt % to 40 wt % of a cryoprotective agent.

2. The method for cryopreservation of a biological sample according to claim 1, wherein applying the shear stress comprises applying a stress by mechanical, sonic, magnetic or electromagnetic field means thereto.

3. The method according to claim 1, wherein the shear stress is applied at a first amplitude during the first phase and the shear stress is applied at a different amplitude during the second phase.

4. The method according to claim 1, wherein the cryopreservation process comprises maintaining the shear thickening stress while cooling the sample to a temperature below the glass transition temperature of the biological sample.

5. The method according claim to claim 1, wherein the cooling occurs at a rate of 50° C. per minute or less.

6. The method according to claim 1, wherein the biological sample is maintained at a temperature below its glass transition temperature during the cooling of the biological sample.

7. The method according to claim 1, wherein the particulate material used as the non-Newtonian additive is selected from silica ($SiO_2$), glass, titanium dioxide, calcium carbonate, alumina, quartz, iron oxide, a synthetic polymer, a starch or a biologically derived starch, or a mixture of two or more of these materials.

8. The method according to claim 1, wherein the cryoprotective agent is present at 10 wt % to 40 wt % in the cryopreservation medium, wherein the cryoprotective agent is selected from the group comprising dimethyl sulfoxide, formamide, acetamide, $C_1$-$C_3$ alcohols, 1,2-isopropyldiol, 1,2-propanediol, ethylene glycol, propylene glycol, glycerol, glucose, mono-saccharides, disaccharides, polysaccharides, ficoll, polyethylene glycol, polyvinylpyrollidine or a combination of two or more of these agents.

9. The method according to claim 7, wherein the non-Newtonian additive is a biologically derived polymer that is hydroxyethyl starch (HES) at a concentration of 45 wt % to 55 wt % in the cryopreservation medium.

10. A method for reconstituting a cryopreserved biological sample cryopreserved by the method according to claim 1, comprising the step of warming the cryopreserved biological sample to its glass transition point and applying a shear thickening stress at a temperature from below or at the glass transition temperature until the temperature of the cryopreserved biological sample rises above its freezing point.

11. The method of claim 1, wherein the first shear rate is between $10^{-4}$ $s^{-1}$ to 0.5 $s^{-1}$.

12. The method of claim 1, wherein the second shear rate is between 1 $s^{-1}$ to 6 $s^{-1}$.

13. A cryopreservation medium with non-Newtonian fluid properties, consisting essentially of an aqueous solution or an aqueous suspension containing between 50 wt % and 60 wt % by weight of a particulate material with a mean particle size of 10 μm or less, and between 10 wt % to 40 wt % of a cryoprotective agent.

14. The cryopreservation medium according to claim 13 wherein the cryoprotective agent is selected from the group consisting of dimethyl sulfoxide, formamide, acetamide, $C_1$-$C_3$ alcohols, 1,2-isopropyldiol, 1,2-propanediol, ethylene glycol, propylene glycol, glycerol, glucose, mono-saccharides, disaccharides, polysaccharides, ficoll, polyethylene glycol, polyvinylpyrollidine or a combination of two or more of these agents.

15. The cryopreservation medium according to claim 13 consisting of 50 wt % to 55 wt % hydroxyethyl starch (HES) as the particulate material, 5 wt % to 20 wt % of cryoprotective agent and water.

16. The cryopreservation medium according to claim 13, wherein the cryoprotective agent is selected from dimethylsulphoxide (DMSO) or a combination of DMSO and one or more of sucrose, glucose, glycerol, raffinose, fructose or lactose.

* * * * *

UNITED STATES PATENT AND TRADEMARK OFFICE
CERTIFICATE OF CORRECTION

| | |
|---|---|
| PATENT NO. | : 11,612,162 B2 |
| APPLICATION NO. | : 15/758831 |
| DATED | : March 28, 2023 |
| INVENTOR(S) | : Kilbride et al. |

It is certified that error appears in the above-identified patent and that said Letters Patent is hereby corrected as shown below:

On the Title Page

Item [73], change ASYMPTOTE LIMITED to BIOSAFE SA

Signed and Sealed this
Twenty-ninth Day of July, 2025

Coke Morgan Stewart
*Acting Director of the United States Patent and Trademark Office*